United States Patent
Takeichi et al.

(10) Patent No.: US 6,514,433 B1
(45) Date of Patent: Feb. 4, 2003

(54) CONNECTING MATERIAL

(75) Inventors: Motohide Takeichi, Kanuma (JP); Hidekazu Yagi, Kanuma (JP); Kaori Suemasa, Kanuma (JP)

(73) Assignee: Sony Chemicals Corporation, Tokyo (JP)

( * ) Notice: Subject to any disclaimer, the term of this patent is extended or adjusted under 35 U.S.C. 154(b) by 103 days.

(21) Appl. No.: 09/658,788

(22) Filed: Sep. 11, 2000

(30) Foreign Application Priority Data

Sep. 14, 1999 (JP) ............................................. 11-261095

(51) Int. Cl.[7] .............................. H01B 1/22; C09J 9/02; C09J 11/08
(52) U.S. Cl. ......................... 252/512; 156/330; 525/107
(58) Field of Search ................................ 252/506, 512; 156/60, 330; 525/107; 526/935; 174/259

(56) References Cited

U.S. PATENT DOCUMENTS

| | | | | |
|---|---|---|---|---|
| 4,524,181 A | * | 6/1985 | Adam et al. ................. | 525/107 |
| H1405 H | * | 1/1995 | Pottick et al. | |
| 5,388,328 A | * | 2/1995 | Yokono et al. ............... | 29/852 |
| 5,726,216 A | * | 3/1998 | Janke et al. .................. | 522/31 |

* cited by examiner

Primary Examiner—Mark Kopec
(74) Attorney, Agent, or Firm—Flynn, Thiel, Boutell & Tanis, P.C.

(57) ABSTRACT

A connecting material for bonding and connecting elements to be bonded together, each element having electrodes thereon in a correspondingly confronting relationship to each other. The material is highly reliable in the strength of bonding of the elements and in building up electroconductive connection between the corresponding electrodes and can provide mechanical bonding and electrical connection effectively even when bonding an element of a polyimide resin film with a counter element, without the occurrence of a reduction in the reliability of the electrical conductance, even in services under a high temperature and high humidity. The connecting material contains an adhesive component containing a thermosetting resin and has, after having been cured, characteristic features of a modulus of elasticity at 30° C. in the range of 0.9–3 Gpa, a glass transition temperature of at the lowest 100° C. and a tensile elongation percentage of at least 3%.

6 Claims, No Drawings

CONNECTING MATERIAL

FIELD OF THE INVENTION

The present invention relates to a connecting material, in particular, that comprises a thermosetting resin, for bonding and connecting elements, each element having correspondingly confronting electrodes.

DESCRIPTION OF THE RELATED TECHNIQUES

A connecting material constituted of, as a main component, a thermosetting resin has been employed for bonding elements, each element being provided with correspondingly confronting electrodes thereon, with simultaneous attainment of electro-conductive connection of the confronting electrodes with each other. For example, in a liquid crystal display (LCD), such a connection is realized between a layer of indium tin oxide (ITO) on a substrate glass board and a tape carrier package (TCP) or a driver IC. Also, in the assemblage of semiconductors, such as an IC and a LSI, on a printed circuit board, it has been practiced to build up an electrical connection between bear chips of these semiconductors and the circuit board directly using a connecting material. Here, the bonding between the circuit board and these elements to be bonded is performed by holding them in a posture in which the electrodes or terminals disposed on the chips and on the circuit board are in a correspondingly confronting relationship with each other, while interposing the connecting material therebetween, whereupon the connecting material is caused to harden to attain a mechanical firm bonding of them and assured electrical connection between the corresponding electrodes simultaneously.

In such a connecting material, a thermosetting resin has been used as the fundamental component. The connecting material is interposed between the elements to be bonded together, such as a printed circuit board and semiconductor chips, and these elements are held at such a posture that the electrodes or terminals to be electroconductively connected together disposed on them are in a correspondingly confronting relationship with each other, whereupon the elements are heat-pressed onto each other by pressing them together with heating to cause the thermosetting resin to set to thereby attain a firm bonding of them. Here, the mechanical bonding between the elements is provided by the adhesive strength of the resin and the electrical connection between the corresponding electrodes or terminals is attained by a pressed friction contact of them secured by the heat setting of the resin. This electrical connection by frictional press contact between the elements may be attained by direct contact of the electrodes or the terminals with each other or under intermediation with electroconductive particles contained in the connecting material in a dispersed state.

Due to the recent demand in the market for so-called light, thin, short and small articles in the fields represented by portable electronic articles, problems have arisen in that the bonding strength is reduced in the portion bonded with a connecting material, for example, between a semiconductor chip and a substrate circuit board or between a TCP and ITO layer, where the bonded contacting area is reduced. In addition, it has been brought into examination to install devices, such as a driver IC etc., on a flexible printed circuit board (FPC), wherein it is requested to increase the bonding strength (peeling strength) for the connecting material. In particular, films of a polyimide resin are employed practically for a FPC, for which no adequate bonding material nor connecting material exhibiting superior adhesion thereto has hitherto been known.

A technique has been known in general for improving the toughness parameter of an adhesive by rendering the adhesive mass more soft, in order to increase the adhesive strength, wherein, however, obstructive phenomena accompany, for example, lowering of the glass transition temperature (referred to in the following sometimes as Tg) and a considerable decrease in the elastic modulus. While, as for the adhesive strength, an increase may be expected by such a treatment, establishment of reliable electroconductive connection between the bonded elements under different conditions becomes difficult. It has been known, for example, that the electrical resistance increases at the junction of bonded elements in accompaniment with the reduction in the adhesive strength upon a high humidity aging at high temperatures. It is important, therefore, how this phenomenon should be suppressed as much as possible.

SUMMARY OF THE INVENTION

An object of the present invention is to provide a connecting material for bonding and connecting elements to be bonded together, each element having electrodes thereon in a correspondingly confronting relationship, which material is highly reliable in the strength of bonding of the elements and in building up electroconductive connection between the corresponding electrodes and which can realize mechanical bonding and electrical connection effectively even when bonding an element of a polyimide resin film with a counter element, without occurrence of a reduction in the reliability of the electroconductive connection, even in services under a condition of high temperature and high humidity.

The present invention resides in the following connecting material:

(1) A connecting material for bonding and connecting elements each having electrodes thereon correspondingly confronting to each other, comprising
an adhesive component comprising a thermosetting resin,
the material having, after having been cured, the characteristic features comprising
a modulus of elasticity at 30° C., in the range of 0.9–3 GPa,
a glass transition temperature of, at the lowest, 100° C. and
a tensile elongation percentage of at least 3%.

(2) The connecting material as defined in the above (1), wherein the adhesive component further comprises 1–90% by weight of, on the one hand, a thermoplastic resin having a glass transition temperature of, at the highest, 50° C. and/or, on the other hand, a microparticulate elastomer having an average particle size of 30–300 nm.

(3) The connecting material as defined in the above (1) or (2), wherein it further comprises 0–40%, based on the volume of the adhesive component, of electroconductive particles.

(4) The connecting material as defined in any one of the above (1) to (3), wherein it exhibits a tensile elongation percentage of at least 6%.

DETAILED DESCRIPTION OF THE DISCLOSURE

For the elements to be bonded together by the connecting material according to the present invention, every pair of elements, each having electrodes correspondingly confronting to each other, in particular, a large number of electrodes to be connected electroconductively with those disposed confrontingly on the other element may serve as the object of connection. The present invention may particularly be applicable to those in which each of two elements to be bonded together has electrodes arranged within a narrow region with a closer pitch, in a small width and at a narrow interval, as in the case of assembling a driver chip or TCP on a glass substrate board in a LCD and in the case of installation of semiconductor chips, such as memories and ASIC, on a circuit board of general use. In many cases, a substrate board is used as the counter element for the above-mentioned IC chip or semiconductor chip to be bonded. The connecting material according to the present invention can be used for assembling semiconductor chips and the like on the substrate board directly or under intermediation with, for example, an interposer. Here, substrate boards made of any chosen material may be used, for example, glass/epoxy substrate boards, resin boards, glass boards and flexible resin boards. In general, a polyimide resin film has a lower adhesive nature. The connecting material according to the present invention can bond even to a polyimide resin film with reliable electroconductive connection of the electrodes disposed thereon with corresponding ones of the counter element. Of course, it can bond to substances other than a polyimide resin, wherein the adhesive strength and the reliability of electroconductive connection are more superior as compared with conventional connecting materials.

The connecting material according to the present invention contains an adhesive component comprising a thermosetting resin. The connecting material is interposed between the elements to be connected together and the elements are pressed onto each other from both sides so as to cause the electrodes disposed opposingly on the confronting face of each element to be brought into contact with each other, while holding the interspace between neighboring electrodes to be filled with the connecting material. In this state, the connecting material is caused to harden in order to attain electrical connection and mechanical bonding simultaneously. The electrical connection between the opposing electrodes may be realized either by a direct contacting of the electrodes or under intermediation by electroconductive particles. If the surface area of a thickened portion of the electrode, such as a stud bump, is small (for example, 1,000 $\mu m^2$ or less), direct contact may be permitted, while a contact under intermediation with electro-conductive particles is favorable for electrodes with greater surface areas. The electroconductive particles are incorporated in the connecting material by being dispersed therein.

As the main resin of the thermosetting resin to be incorporated according to the present invention in the connecting material, any kind of resin capable of being cured by a concurrent use of a hardening agent under the action of heat or irradiation of a ray, such as a UV ray or the like, may be used, for example, epoxy resins, urethane resins, phenol resins, hydroxyl group-containing polyester resins, hydroxyl group-containing acryl resins and so on. Epoxy resins are at the most preferable in view of the balance between the participant parameters, such as hardening temperature, hardening time, storage stability and so on of the resin.

As the epoxy resins, those of the bisphenol type, those of the epoxy-novolak type and those obtained from epoxy compounds having two or more oxirane groups in the molecule may be used. Commercial products of these epoxy resins may also be employed as such.

While the main resin of the thermosetting resin of the connecting material can be subjected to hardening usually by a concurrent use of a hardening agent, it is permissible to dispense with the use of the hardening agent when a substituent functional group facilitating the hardening reaction is present in the molecule of the main resin. As the hardening agent, there may be used those which can be subjected to the hardening reaction with the main component resin under the influence of heat or irradiation of a ray, for example, imidazoles, amines, acid anhydrides, hydrazides and dicyandiamides, as well as modified products of them. Commercial products may also be employed. For such a hardening agent, preference is given to a latent hardening agent.

A latent hardening agent will not be subjected to a curing reaction during processing operations and storage at normal temperatures and upon drying at a relatively lower temperature (40–100° C.) but causes a curing reaction under pressure with heating (heat-pressing) at a curing temperature or by the action of heat or irradiation of a ray, such as a UV ray. For such a latent hardening agent, particular preference is given to one in which the above-mentioned hardening agent, such as an imidazole or an amine, is encapsulated in microcapsules, for which commercial products may also be employed. For activation by heating, those having a curing initiation temperature of 80–150° C. may be preferred.

The connecting material according to the present invention comprising such a thermosetting resin may contain a thermoplastic resin having a Tg of not higher than 50° C. and/or a microparticulate elastomer having an average particle size of 30–300 nm, in order to obtain the above-mentioned material properties.

As the thermoplastic resin, there may be used a resin having a Tg of not higher than 50° C., preferably not higher than 30° C., and a rubbery elasticity at room temperature, for example, an acryl resin or a polyester resin.

As the microparticulate elastomer, a microparticulate product of a natural or synthetic rubber having a Tg of not higher than 50° C, preferably not higher than 30° C., and a rubbery elasticity at room temperature may be used, for example, a microparticulate product of natural rubber (NR), isoprene rubber (IR), butadiene rubber (BR), styrene/butadiene rubber (SBR), chloroprene rubber (CR) or acrylonitrile/butadiene rubber (NBR).

For this, cross-linked rubber is used, while a thermoplastic elastomer may also be used therefor, so long as its Tg is not higher than 30° C. The average particle size of the microparticulate elastomer may favorably be in the range of 30 to 300 nm, preferably 50 to 200 nm. Also for the microparticulate elastomer, a commercial product may be employed as such.

According to the present invention, it is permissible to admix a thermoplastic polymeric substance having a Tg of higher than 50° C. to the adhesive component, in order to impart to the connecting material an ability for being coated on substrates or for film-forming. For such a thermoplastic polymeric substance, there may be used, for example, a phenoxy resin, a polyester resin or an acryl resin.

The adhesive component of the connecting material according to the present invention may further contain other additives, such as coupling agent, antioxidant, surfactant and so on.

The connecting material according to the present invention comprising the adhesive component described above may or may not contain electroconductive particles. Thus, it may contain particles of a metal, such as a solder metal, nickel metal or so on; electrical conductor-coated particles in which the core resin particles are coated with an electroconductive material by way of plating or the like; and insulator-coated particles in which these electroconductive particles are coated with an insulating resin. The average particle size of these electroconductive particles may be in the range of from 1 to 20 μm, preferably in the range of from 3 to 10 μm.

While the adhesive component of the connecting material according to the present invention may contain the thermosetting resin in an amount in the range of from 10 to 99% by weight, preferably in the range of from 40 to 70% by weight, a thermoplastic resin having a Tg of higher than 50° C. in an amount of 0–50% by weight, preferably 10–30% by weight, a thermoplastic resin having a Tg of not higher than 50° C. and/or a microparticulate elastomer in an amount in the range of from 1 to 90% by weight, preferably from 5 to 30% by weight, and other additive(s) in an amount of 0–10% by weight, preferably 0–5% by weight. The electroconductive particles may be contained in the connecting material in an amount of 0 to 40% by volume, preferably 0 to 30% by volume, based on the total sum volume of the above-mentioned constituent ingredients of the adhesive component.

The connecting material according to the present invention may be provided as a product in a form of a paste or a film.

For preparing a paste of the connecting material, suitable constituent ingredients may be chosen to form a paste without using any solvent, while, in general, it is practical to form the paste by dissolving or dispersing the constituent ingredients in a suitable solvent. As the solvent, there may be used, for example, alcohols, ketones, esters, ethers, phenols, acetal and nitrogen-containing hydrocarbons, wherein, specifically, toluene, MEK, ethyl acetate and cellosolve acetate may be exemplified. The amount of the solvent to be used may be about 20–40%, based on the weight of the resin components.

For preparing the connecting material in a form of a film, the above paste of the connecting material is coated on an exfoliative sheet in a layer, whereupon the solvent of the paste is volatilized to build up a film.

The connecting material according to the present invention should be formulated from the constituent ingredients so that the resulting connecting material after having been cured will have an elastic modulus at 30° C. in the range from 0.9 to 3 Gpa, preferably in the range from 0.9 to 2 Gpa, a Tg of not lower than 100° C., preferably in the range from 110 to 180° C, and a tensile elongation percentage of at least 3%, preferably in the range from 5 to 16%, by selecting suitable ingredients and their proportion.

The specific procedures for the determination of the above-mentioned characteristic properties are as follows:
Elastic modulus is determined by DMA Method.
Tg is determined as the temperature at the peak of tan δ on the determination of the elastic modulus.
Tensile elongation percentage is determined by the method according to JIS K-7161.

The connecting material according to the present invention is interposed between two elements to be connected together, such as a substrate circuit board and a semiconductor chip, each provided on the confronting face with a plurality of electrodes or terminals, while holding these elements in a posture in which the electrodes or terminals on the confronting face of each of the elements are in a correspondingly confronting relationship to each other, whereupon the elements are heat-pressed by pressing them together from both sides with heating to cause the thermosetting resin to cure and form a solid assembly. In the case of using a paste of the connecting material, it is coated on one of the elements over a bonding region including the electrodes, whereupon the other one of the elements is placed on the so-coated face of the said one of the elements before or after drying the coated layer in such a position that the correspondingly confronting electrodes or terminals are in proper opposition to each other, followed by heat pressing of the assemblage to cause curing of the resin. In the case of using a film of the connecting material, it is interposed between the two elements to be connected together, followed by heat pressing of the assemblage to cause curing of the resin. The curing may be realized not only by heating but also by the action of irradiation of a ray, such as a UV ray.

In the connecting procedures described above, by heat-pressing the connecting material interposed between the two elements to be connected together, the connecting material is first melted and expelled from the interspace between the opposing electrodes aside to the free space where the electrodes are absent, until the opposing electrodes on the elements have been brought into contact with each other and the opposing electrodes pressed together to build up an electroconductive frictional contact of them, whereupon the connecting material is cured within the heat-pressed interspace to form the solid assembly. When electroconductive particles are included, some of these particles will remain in between the opposing electrodes upon the heat pressing and are pressed there to build up a bridge of electroconductive frictional contact between these opposing electrodes. The portion of the connecting material expelled from the interspace between the opposing electrodes aside to the free space where the electrodes are absent will be cured there to build up a solid fixed bonding between the two elements. In this manner, an electroconductive connection between the opposing electrodes and a mechanical solid fixation of the two elements are effected simultaneously, whereby the electrical connection and the mechanical bonding of the two elements are established. By using the connecting material according to the present invention, a mechanical bonding of the elements to be connected and an electroconductive connection between the correspondingly opposing electrodes or terminals are securely established, even when the contacting surface area of the electrodes or terminals is small and the interstices between the neighboring electrodes or terminals are narrow or when bonding a polyimide resin film, such as FPC. In the case of bonding elements other than those made of a polyimide resin, a higher bonding strength is achieved.

In the case of installing an element to be connected, for example, a semiconductor chip or the like, on the counter element to be bonded, such as a substrate circuit board, the former is assembled on the latter by the procedures described above and the resulting assembly will be brought into service under an environmental condition of higher temperature and higher humidity. Here, a high reliability in the electroconductive connection over a long term can be attained with the exclusion of the occurrence of defective electrical conductivity, by employing the connecting material according to the present invention.

As described above, it is possible according to the present invention, to obtain a connecting material which is superior in adhesive strength and reliability of electroconductive connection, while attaining an effective electrical connection between corresponding pairs of electrodes or terminals disposed on the elements to be connected and an effective mechanical bonding of the elements, even in the case of bonding a film of a polyimide resin, with the simultaneous attainment of an advantage that the reliability of an electroconductive connection will not be debased after long term service under a condition of a higher temperature and higher humidity.

THE BEST MODE FOR EMBODYING THE INVENTION

Below, the present invention will further be described by way of Examples and Comparative Examples.

EXAMPLES 1 to 5

Comparative Examples 1 to 3

Preparation of the Connecting Material

A composite paste of connection material was prepared by blending an epoxy resin (a product of Dainippon Ink & Chemicals Inc. with the trade name 4032 D) as the thermosetting resin, a hardening agent based on imidazole (a product of Asahi Chemical Industry Co., Ltd. with the trade name HX-3941 HP), a microparticulate polybutadiene rubber (a product of Kuraray Co., Ltd., with an average particle size of 80 nm) as the microparticulate elastomer, an acryl resin (a product of Fujikura Kasei Co., Ltd. with the trade name SG 80, with a Tg of −25° C.) as the thermoplastic resin having a Tg of not higher than 50° C., a phenoxy resin (a product of Tohto Kasei Co., Ltd. with the trade name YP 50, with a Tg of 80° C.) as the thermoplastic resin having a Tg higher than 50° C. and electrical conductor-coated particles (a product of Nippon Chemical Industrial Co., Ltd. with the trade name EH 20 GNR, with an average particle size of 5 µm) as the electroconductive particles with toluene as the solvent, in a proportion as given in Table 1. The so-prepared paste was coated on an exfoliative film made of polyethylene terephthalate (PET), which had been subjected to an exfoliative surface treatment, up to a thickness which would result in a dry layer thickness of 40 µm, whereupon the coating layer was placed in a hot air circulating furnace at 80° C. for 5 minutes, whereby a connecting material in a form of film was obtained.

Material Property Test

For determining the elastic modulus, the film coated with the uncured connecting material was cut into ribbons of a size of 6 cm×0.2 cm, which were then subjected to curing at 180° C. for 15 minutes, whereupon the cured layer of the connecting material was peeled off from the PET film for use as the testing sample. For the testing, VIBRON DDV 01 FP (trade name) of the firm Orientec was used and the determination was carried out at a vibration frequency of 11 Hz, a temperature elevation rate of 3° C. per minute and a chuck-to-chuck distance of 5 cm.

The temperature at the peak of tan δ in the testing of the elastic modulus was determined as the Tg.

Tensile Test

For the tensile test, the film coated with the uncured connecting material was cut into ribbons of a size of 1 cm×15 cm using a cutter knife, which were then subjected to curing at 180° C. for 15 minutes in a hot air circulation furnace, whereupon the cured layer of the connecting material was peeled off from the PET film for use as the testing sample. For the testing, tensile tester AUTOGRAPH AGS-H and a video elongation meter of Model DVE-200 of Shimadzu Corp. were used and the determination of the tensile elongation percentage was carried out at a drawing speed of 1 mm per minute, a chuck-to-chuck distance of 10 cm, a calibration gauge distance of 5 cm and a testing temperature of 23° C.

Connection Test

The bump electrodes of an IC chip (made of silicon, with a size of 6 mm×3 mm with a thickness of 0.4 mm, having 272 gold-plated bumps, each bump having a bump thickness of 20 µm, disposed at an interval of 85 µm) were connected to corresponding connection terminals on an FPC substrate board under intermediation by the connecting material of a form of film prepared as above. The FPC substrate board was made of a polyimide resin film having a thickness of 25 µm (a product of Toray Industries, Inc. of trade name KAPTON with a size of 40 mm×40 mm), on which a circuit pattern was printed (12 µm copper, plated with nickel/gold) so as to correspond to the bumps on the IC chip. On the substrate board, the IC chip was placed under intermediation by the connecting material film in such a manner that each corresponding pair of the bump and the terminal of the printed circuit was in proper opposition to each other, whereupon the resulting assembly was subjected to a heat pressing under a condition of 190° C.×10 seconds×39.2 N (4 kgf) pressing force to establish an electroconductive connection.

For this connected assembly, a 90° peeling strength was determined as the bonding strength.

For the reliability of the electroconductive connection, the connection resistance was determined by a so-called tetra terminal-method in which the connection resistance was determined initially and after standing for 1,000 hours under a condition of 85° C. and 85% relative humidity, from which the average was taken from determinations at 40 different portions of the detecting terminals.

The results are recited in Table 1.

TABLE 1

|  | Example | | | | | Comparative Example | | |
| --- | --- | --- | --- | --- | --- | --- | --- | --- |
|  | 1 | 2 | 3 | 4 | 5 | 1 | 2 | 3 |
| Adhesive component (wt. part) | | | | | | | | |
| Epoxy resin | 25 | 20 | 30 | 25 | 20 | 30 | 5 | 50 |
| Hardening agent | 40 | 40 | 40 | 40 | 40 | 40 | 40 | 40 |
| Micropartic. rubber | 5 | 10 | — | 5 | 10 | — | — | — |
| Acrylic resin | — | — | 10 | 10 | — | — | 35 | — |
| Phenoxy resin | 30 | 30 | 20 | 20 | 30 | 30 | 20 | 10 |
| Electrocond. particles[1)] | — | — | — | — | 12 | — | — | — |

TABLE 1-continued

|  | Example | | | | | Comparative Example | | |
| --- | --- | --- | --- | --- | --- | --- | --- | --- |
|  | 1 | 2 | 3 | 4 | 5 | 1 | 2 | 3 |
| Material Property | | | | | | | | |
| Tg (° C.) | 140 | 135 | 130 | 131 | 135 | 142 | 95 | 147 |
| Elastic modulus (GPa) | 2.1 | 1.9 | 1.8 | 1.9 | 2.0 | 2.2 | 0.8 | 3.2 |
| Elongat. percentage (%) | 3.6 | 6.8 | 3.7 | 7.2 | 6.1 | 2.5 | 12.1 | 1.9 |
| Test Results | | | | | | | | |
| Adhesive strength (g/cm) | 620 | 780 | 710 | 810 | 720 | 450 | 750 | 390 |
| Initial resistance (Ω) | 8 | 8 | 8 | 8 | 8 | 8 | 8 | 8 |
| Resist. aft. 1000 h (Ω) | 10 | 9 | 9 | 10 | 8 | 16 | 30 | 24 |

Note
[1]: Volume %, based on the volume of adhesive component.

From the results given in Table 1, it is seen that all the connecting materials of Examples 1 to 5 show superior bonding performances, even when compared to the polyimide resin film, and show also superior results as to the reliability of the electroconductive connection. In contrast thereto, Comparative Examples 1 to 3, in which the features prescribed by the present invention are not satisfied, indicate a case of the occurrence of inferior bonding strength and show inferior electroconductive connection performance for all these Comparative Examples.

What is claimed is:

1. A connecting material for bonding and connecting elements having electrodes provided thereon correspondingly confronting to each other, said connecting material comprising an adhesive component which comprises:

a thermosetting resin;

a thermoplastic resin having a glass transition temperature greater than 50° C.; and one or more components selected from the group consisting of a thermoplastic resin having a glass transition temperature not greater than 50° C. and a microparticulate elastomer having a glass transition temperature not greater than 50° C.;

and having a modulus of elasticity at 30° C. in the range of 0.9–3 GPa, a glass transition temperature no lower than 100° C. and a tensile elongation percentage of at least 3%.

2. The connecting material of claim 1, wherein the adhesive component comprises 1–90 wt. % of said one or more components.

3. The connecting material of claim 1, further comprising 0 to 40%, based on the volume of the adhesive component, of electroconductive particles.

4. The connecting material of claim 1, wherein the tensile elongation percentage is at least 6%.

5. The connecting material of claim 1, additionally comprising electroconductive particles having an average particle size of 1–20 μm.

6. The connecting material of claim 1, wherein said thermosetting resin is present in an amount of 40 to 70 wt. %, said thermoplastic resin having a Tg of greater than 50° C. is present in an amount of 10–30 wt. % and said one or more components is present in an amount of 5–30 wt. %.

* * * * *